PICTURE SIGNAL APERTURE COMPENSATION SYSTEM

Filed Feb. 1, 1955 3 Sheets-Sheet 1

INVENTORS
WALTER G. GIBSON
& ALFRED C. SCHROEDER
BY [signature]
ATTORNEY

PICTURE SIGNAL APERTURE COMPENSATION SYSTEM

Filed Feb. 1, 1955 3 Sheets-Sheet 2

INVENTORS
WALTER G. GIBSON
& ALFRED C. SCHROEDER
BY [signature]
ATTORNEY

PICTURE SIGNAL APERTURE COMPENSATION SYSTEM

Filed Feb. 1, 1955 3 Sheets-Sheet 3

INVENTORS
WALTER G. GIBSON
& ALFRED C. SCHROEDER
BY [signature]
ATTORNEY 2,899,495

PICTURE SIGNAL APERTURE COMPENSATION SYSTEM

Walter G. Gibson, Princeton, N.J., and Alfred C. Schroeder, Huntingdon Valley, Pa., assignors to Radio Corporation of America, a corporation of Delaware Application February 1, 1955, Serial No. 485,509

10 Claims. (Cl. 178—7.2)

This invention relates to video signalling systems, and, more particularly, to the aperture compensation of image representative signals in an image scanning system for effective aperture loss in a direction perpendicular to the scanning lines.

Resolution of a pictorial representation such as a television picture is, in part, a function of the effective apertures of the video signal generating and reproducing apparatus. In the types of such apparatus generally employed at present, the effective apertures of the pickup and reproducing devices are defined by the spot sizes of the respective electron beams used to scan the targets of these devices. It is desirable to make the effective aperture as small as practicable in order to convey a maximum of picture detail information.

Numerous systems using electrical filters have been designed and used to compensate for effective aperture loss in the direction of line scanning, which usually is the horizontal direction and shall be so considered for the purposes of the present description. However, the use of similar apparatus to compensate for effective aperture loss in a vertical direction has not heretofore been deemed practical. It has however been recognized that by suitably combining with information derived from the scanning of each pickup raster line, information derived from the scanning of vertically adjacent areas, e.g. the immediately preceding and the immediately succeeding scanning lines, aperture compensation in the vertical direction may be achieved.

A vertical aperture compensation system has been proposed in which information concerning the preceding and the succeeding lines may be derived during the scanning of a given line through the use of "spot wobble" in the vertical direction. Thus, the scanning beam of an image pickup device is wobbled in the vertical direction to traverse regions of the scanned target above and below as well as on a given line of the scanning raster during each line scanning interval.

In accordance with embodiments of the present invention, a novel and improved system is provided for utilizing the signal output of an image pickup device employing such spot wobble to carry out desired aperture compensation in the vertical direction.

In accordance with a particular embodiment of the present invention, low pass filter means are provided for selecting video signals from the signal output of a spot wobbled image pickup device, the video signals comprising the sum of video signal components representative of the nominally scanned line, the line (or lines) immediately preceding the given line, and the line (or lines) immediately succeeding the given line. Additional video signals are obtained from the pickup device output signal, through the process of heterodyning the output signal with oscillations of double the wobble frequency, which comprise video signal components representative of the given line minus the video signal components representative of the preceding and succeeding lines. The respective "sum" and "difference" signals are added together to obtain the aperture compensated video output signals. Control of the degree or amount of aperture compensation attained is achieved by suitably controlling the relative amplitudes of the respective "sum" and "difference" signals. In another embodiment of the present invention, the combined sum and difference signals are both obtained from the output of the heterodyning means. In still another embodiment of the present invention, the desired difference signal is obtained utilizing an amplitude detector.

It is an object of the present invention to provide a novel and improved picture signal compensation system.

It is a further object of the present invention to improve picture resolution in a television system by providing novel means for compensating video signals for effective aperture loss.

An additional object of the present invention is to provide a novel system for generating video signals compensated for effective aperture loss in a vertical direction.

It is also an object of the present invention to provide novel and improved vertical aperture compensation apparatus in a video signal generating system.

Other objects and advantages of the present invention may be readily ascertained upon a reading of the following detailed description and an inspection of the accompanying drawing in which.

Figures 1, 2, 3, 7:
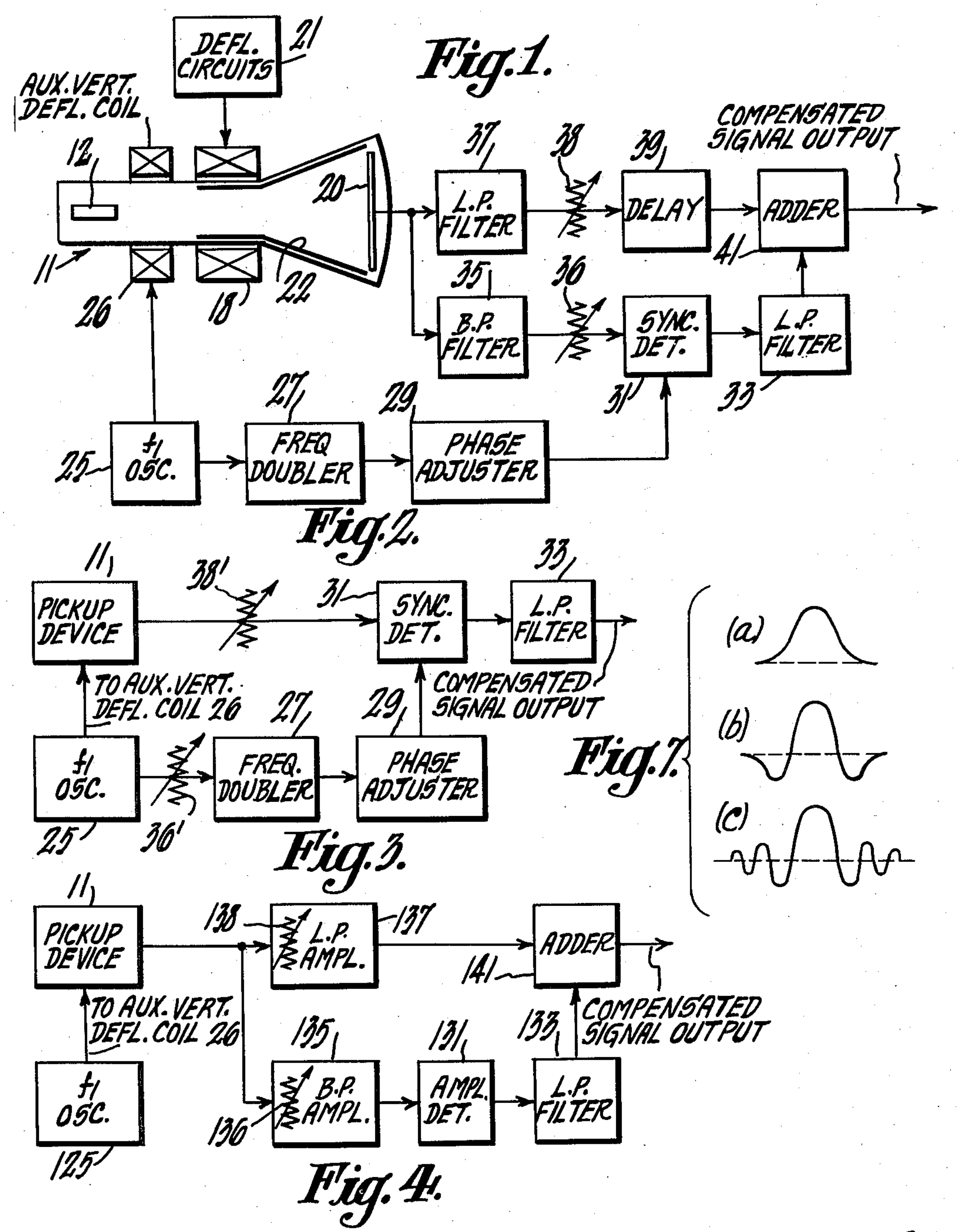
Figures 1 and 2 illustrate in block and schematic form video signal generating apparatus in which provision is made for aperture compensation in the vertical direction in accordance with respective embodiments of the present invention.
Figure 7 shows energy distribution graphs of aid in explaining advantages of the foregoing and additional embodiments of the invention.

In Figure 1 utilization of an embodiment of the present invention in effecting vertical aperture compensation of signals generated by a conventional video signal generating device is illustrated. For purposes of example, the signal generating device 11 has been illustrated as one of the so-called monoscope type, a well-known type of pickup device generally used for producing a test signal from a static image which is printed on the beam target within the tube. However, it should be recognized that the present invention is generally applicable to a variety of forms of image pickup devices, including such well-known scanning devices as the image orthicon, vidicon, iconoscope, flying spot scanner, etc. Monoscope 11, which may be of the 2F21 type, for example, is provided with a conventional electron gun 12, deflection yoke 18, beam target or "pattern" electrode 20 and secondary electron collector 22. The deflection yoke 18 is energized with the usual scanning waves developed in deflection circuits 21 to cause the beam to trace a conventional interlaced scanning raster on the target 20.

In accordance with well-known spot wobble principles, oscillations of a relatively high frequency $f_1$ developed by an oscillator 25 are applied to an auxiliary vertical deflection coil 26 to impose a high frequency wobble in the vertical direction upon the scanning beam in addition to the usual vertical scanning deflection thereof. It will be appreciated that while an auxiliary vertical deflection coil 26 has been illustrated as a particularly suitable means for subjecting the beam to the desired vertical wobble, use of the auxiliary coil is not essential and alternatively the wobble frequency waves may be applied to the vertical deflection windings of the main yoke 18 in addition to the usual vertical scanning waves applied thereto.

Figure 4:
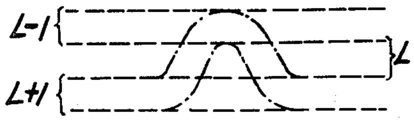
Figure 4 illustrates graphically the wobble path of the pickup tube scanning beam in the systems of Figures 1, 2 and 3.

In Figure 4 three successive lines of a conventional interlaced scanning raster are represented by the bracketed regions outlined with dotted lines and labeled $L-1$ L, and $L+1$, the lines $L-1$ and $L+1$ being normally traced during a different scanning field than the intermediate line L. The beam path outlined in dot-dash lines in Figure 4 is illustrative of the path traced by the wobbled scanning beam of pickup tube 11 relative to the conventional raster lines during the line scanning interval when energization of the yoke 18 would normally cause the tracing of raster line L. It will be observed from Figure 4 that instead of tracing a straight-line path along line L, the beam oscillates in position about line L, alternately passing upwardly to traverse the line $L-1$ region and passing downwardly to traverse the line $L+1$ region, due to the wobble deflection field of auxiliary vertical deflection coil 26.

It should be recognized that the wobble deflection amplitude shown in Figure 4 is illustrative only, and that lesser or greater amplitudes of wobble deflection are feasible and often desirable in particular applications of the embodiments of the present invention. Thus, for example, the wobble deflection may be such as to also cause beam impingement on lines $L-2$ and $L+2$, $L-3$ and $L+3$, etc. during each wobble cycle, if desired.

It may also be noted that the exact choice of the wobble frequency is not particularly critical, but it is desirably at least twice as high as the maximum video frequency required of the system, and may, for example be a frequency of 10 mc.

The output signal of the spot wobbled pickup device 11, derived from target electrode 20, may be analyzed as comprising:

$$e_L[A_0+A_1\cos 2\omega_1 t+A_2\cos 4\omega_1 t+\ .\ .\ .]$$
$$+e_{L-1}[B_0+B_1\cos(\omega_1 t+90°)+B_2\cos(2\omega_1 t\ 180°)+\ .\ .\ .]$$
$$+e_{L+1}[C_0+C_1\cos(\omega_1 t+270°)+C_2\cos(2\omega_1 t+540°)+\ .\ .\ .]$$

where $e_L$ corresponds to the video signal component representative of information on the line L, and where $e_{L-1}$ and $e_{L+1}$ correspond to the respective video signal components representative of information on the preceding line $L-1$ and the succeeding line $L+1$, respectively.

The pickup device output signal, of the above-indicated character, is applied to a low pass filter 37, which may have a cut-off frequency corresponding to the maximum video frequency required of the system (e.g. 4.5 mc.), and which thus is significantly lower than the $f_1$ wobble frequency. It will be appreciated that the output of low pass filter 37 will simply comprise a video signal of the character:

$$e_LA_0+e_{L-1}B_0+e_{L+1}C_0$$

the wobble frequency components and harmonics being rejected by filter 37.

The output of pickup device 11 is also applied to a bandpass filter 35, having a passband filter about a frequency of $2f_1$, the width of the passband corresponding, for example, to twice the width of the passband of low pass filter 37. The signal passed by filter 35 comprises a signal of the character:

$$e_LA_1\cos 2\omega_1 t+e_{L-1}B_2\,2\cos(2\omega_1 t+180°)+$$
$$e_{L+1}C_2\,2\cos(2\omega_1 t+540°)$$

This signal is applied to a synchronous detector 31 for heterodyning with oscillations derived from oscillator 25, doubled in frequency in frequency doubler 27, and suitably adjusted in phase by phase adjuster 29. A low pass filter 33, which may, for example, have a passband corresponding to that of low pass filter 37, selects from the modulation products of the heterodyning action in detector 31 video signals of the form:

$$k\left(e_L\frac{A_1}{2}-e_{L-1}\frac{B_2}{2}-e_{L+1}\frac{C_2}{2}\right)$$

These signals are added to the video signals passed by low pass filter 37 by conventional adding means 41. Control of the relative amplitudes of the "sum" and "difference" signals added by means 41 may be effected by utilizing suitable gain controls for the respective signal channels, such as the indicated output gain controls 38 and 36 for the low pass filter 37 and bandpass filter 35, respectively. A simplified expression for the output of adder 41, assuming substantial symmetry of the vertical wobble, is:

$$K_1e_L-K_2(e_{L-1}+E_{L+1})$$

It may be appreciated from previous discussions that the output of adder 41 thus comprises a video signal aperture compensated in the vertical direction, comprising picture information of the nominally scanned raster line from which is subtracted a predetermined amount of information of areas vertically adjacent to such raster line, i.e. the preceding and succeeding raster line. Control of the relative amplitudes of the signal components summed in adder 41, as by means of the aforementioned gain controls 38 and 36, determines the $K_1$ and $K_2$ factors in the above expression for adder 41 output, and thus permit adjustment of the amount of aperture compensation attained. Where required to equalize the delay of the "sum" signal with the delays suffered by the "difference" signals, suitable delay means 39 may be provided in the sum signal channel, as indicated in the drawing.

Figure 2 illustrates another embodiment of the present invention in which the apparatus 35, 37, 39, 41 of the Figure 1 system is omitted and the combined "sum" and "difference" signals are obtained from the output of detector 31 itself. In this embodiment, the output signal of pickup device 11 is applied without bandwidth restriction to the detector 31 for heterodyning with the double wobble frequency oscillations provided by apparatus 25, 27, 29. Among the modulation products of the synchronous detector 31, which must be assumed not to be of the balanced modulator type for the purposes of this embodiment, are the respective input signals, i.e. the pickup device output signal and the unmodulated double wobble frequency waves. Thus, the low pass filter 33 selectively passes, in addition to the "difference" signal obtained by synchronously detecting the $2\omega_1$ carrier component of the pickup device output signal, the "sum" signal which comprises the video component $$(e_LA_0+e_{L-1}B_0+e_{L-1}C_0)$$

of the pickup device output signal. It will therefore be appreciated that the output of low pass filter 33 comprises the desired compensated video signals of the previously indicated character: $K_1e_L-K_2(e_{L-1}+e_{L+1})$. Here, adjustment of the $K_1$ and $K_2$ factors to control the amount of aperture compensation effected may be carried out through control of the amplitudes of the respective input signals to detector 31, as by the indicated gain controls 38' and 36'.

In Figure 3 vertical aperture compensation apparatus in accordance with still another embodiment of the present invention is illustrated. It will be noted that in this embodiment, the synchronous detection utilized in the previously discussed embodiments to obtain the "difference" signal is not employed, but rather supplanted by use of a conventional amplitude detector 131 for this purpose. Bandpass amplifier 135, through which the pickup device output signal is applied to amplitude detector 131, is provided with a passband characteristic which may substantially correspond to that of bandpass filter 35 in Figure 1, and additionally provides sufficient amplification of the pickup device output signal to obtain a detector output signal of useful amplitude. It will be appreciated that conventional amplitude detection of the $$[e_L A_1 \cos 2\omega_1 t + e_{L-1} B_2 2 \cos (2\omega_1 t + 180°) + e_{L+1} C_2 2 \cos (2\omega_1 t + 540°)]$$

signal supplied by bandpass amplifier 35 provides the desired difference signal, which may be passed by low pass filter 133 to adder 141 for combination with the sum signal passed by low pass amplifier 137. Where required to equalize the delay of the sum signal to the delay suffered by the difference signal, suitable delay means may be provided in the sum signal path, as in the illustrative Figure 1 arrangement. The output of adder 141 is of the familiar form:

$$K_1 e_L - K_2 (e_{L-1} + e_{L+1})$$

Control of the $K_1$ and $K_2$ factors to permit adjustment of the degree of aperture compensation attained may again be provided by controlling the relative amplitudes of the sum and difference signals, as by the indicated gain controls 138 and 136 incorporated in the respective amplifiers 137 and 135.

Figure 5:
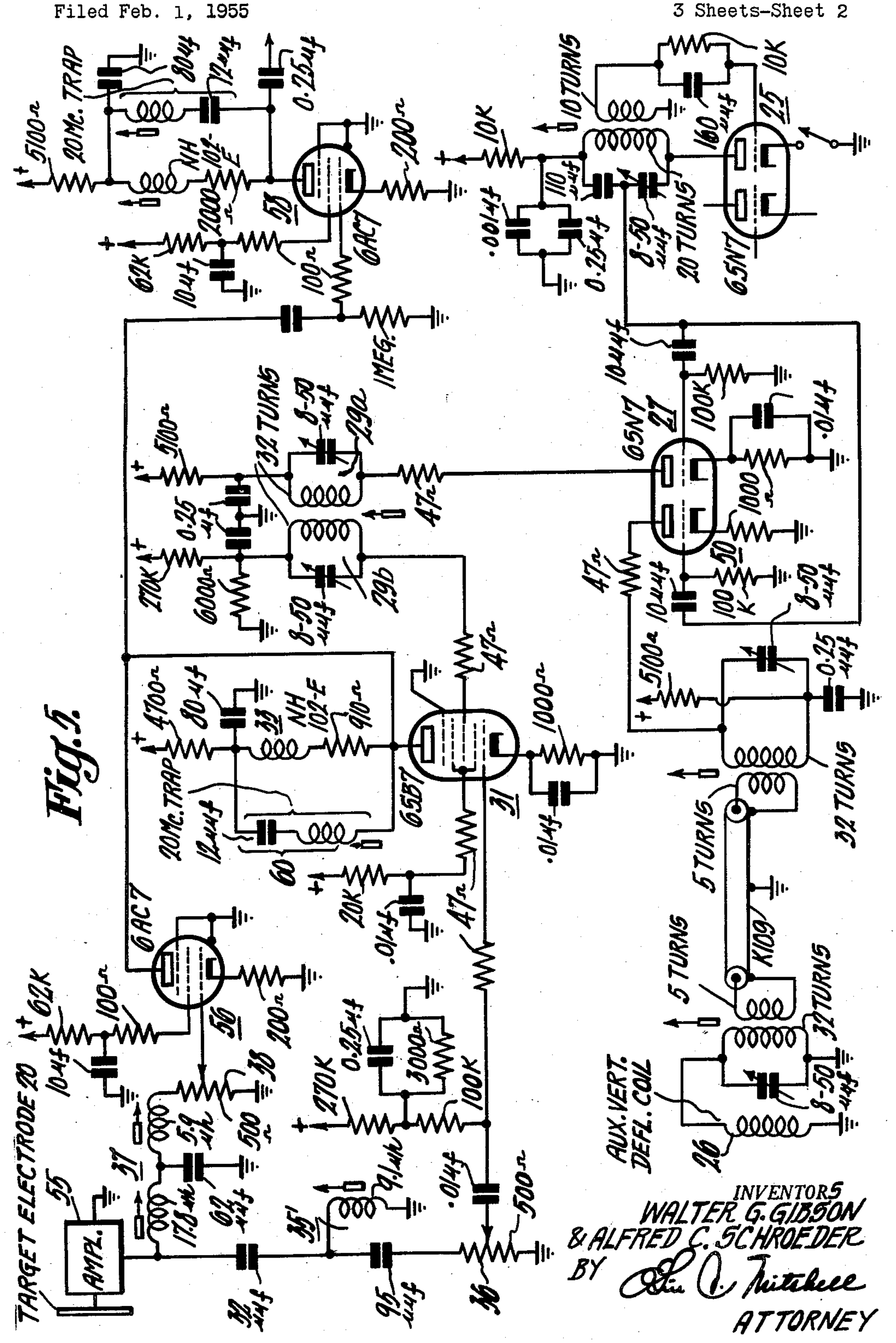
Figures 5 and 6 illustrate in schematic detail aperture compensation systems in general accordance with respective embodiments illustrated in Figures 1 and 2.
Figure 6:
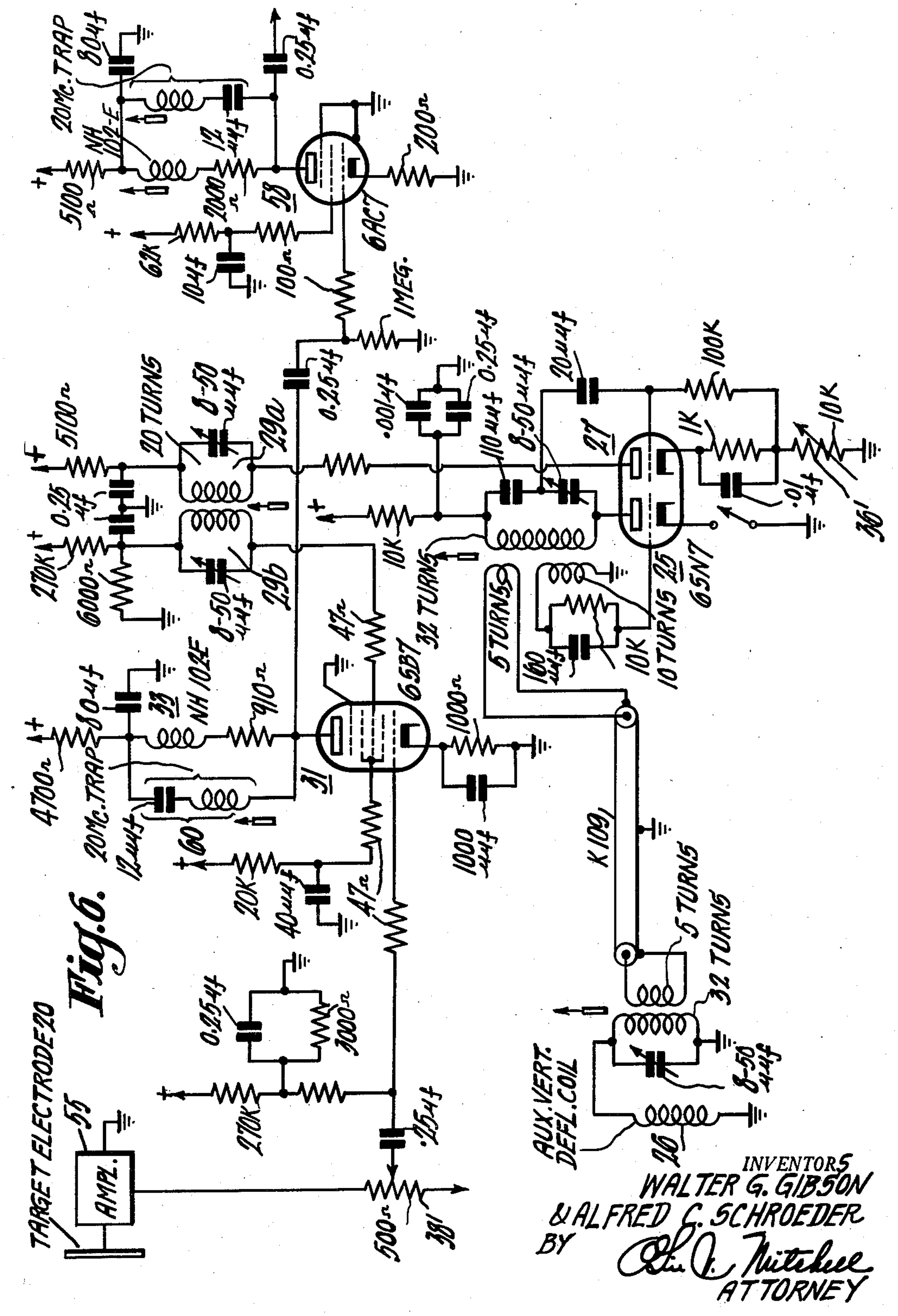

It may be appreciated from the foregoing description that a variety of circuit arrangements may be utilized in carrying out the principles of the present invention relating to vertical aperture compensation. Several embodiments have been discussed in which separate channels are provided for derivation and amplitude control of the "sum" and "difference" signals to be combined; another has been disclosed in which such separate channels are not required. Several embodiments have been disclosed in which synchronous detection is employed in deriving the "difference" signal, another has been disclosed in which such synchronous detection is not required. It should be recognized that additional variations in circuit arrangement for deriving the aperture compensated signal from the spot wobbled pickup device output may be devised without departing from the scope of the present invention. In Figures 5 and 6 there are illustrated in schematic detail circuit arrangements of the general type illustrated in block form in Figures 1 and 2, respectively, but certain departures from, and augmentations of the block representations will be noted in analyzing these circuits.

In Figure 5, an oscillator 25 is schematically illustrated as serving as the source of wobble frequency oscillations, at an illustrative wobble frequency $f_1$ of 10 mc. The output of oscillator 25 is applied to a buffer amplifier 50. The output of amplifier 50 being applied via appropriate circuitry to the auxiliary vertical deflection coil 26 of the pickup device 11 (latter not illustrated in detail in this figure). The oscillator 25 output is also coupled to the input of frequency doubler 27, the plate circuit of which includes a tank circuit **29*a* tuned to double the wobble frequency. Tank circuit 29*b*, inductively coupled to tank circuit 29*a*, is connected to the third grid of a pentagrid tube which serves as the synchronous detector 31. The adjustable trimmer capacitors of tank circuits 29*a*, 29*b* permit use of the latter as the means for properly adjusting the phase of the double wobble frequency oscillations applied to synchronous detector 31**.

The output signal of pickup device 11, derived from the target electrode 20, is applied to an amplifying stage 55, which may, for example, comprise the first stage of a conventional broad band camera preamplifier. The output of amplifier 55 is applied via high pass filter 35' to the first grid of the pentagrid detector 31. With respect to the use of high pass filter 35' in the path of application of the pickup device output signal to the detector 31, it may be noted that this is a generally permissible alternative to the use of a bandpass filter 35, as indicated in the block diagram of Figure 1. In most practical applications of the embodiment under discussion, the failure to eliminate $f_1$ harmonics from the pickup device output signal applied to detector 31 will not appreciably disturb the previously indicated mode of operation.

The plate circuit of detector 31 is provided with a low pass filter 33 to attenuate modulation products falling outside the desired range. It will, however, also be noted that in the particular circuit illustrated, it was found desirable additionally to provide a $2f_1$ trap in the detector 31 plate circuit, (the LC combination 60 being series resonant at the 20 mc. double wobble frequency) to particularly attenuate the rather strong double wobble frequency component appearing in the detector 31 output. The plate of detector 31 is tied to the plate of an amplifier 56, which receives at its input the pickup device 11 output signal components passed by low pass filter 37, to effect the desired addition of "sum" and "difference" signals. The combined signals are applied to the input of an amplifier 58, the output electrode of which may be coupled to the grid of the second stage of the usual camera preamplifier. It will be noted that additional means for low pass filtering and $2f_1$ trapping are provided in the plate circuit of amplifier 58.

The gain controls 38 and 36, which as discussed with respect to Figure 1 provided control of the amount or degree of aperture compensation attained via control of the relative amplitudes of the "sum" and "difference" signals that are combined to comprise the compensated output signal, take the form, in the schematic of Figure 5, of respective potentiometers across which the outputs of filters 37 and 35' appear. The respective adjustable taps of potentiometers 38 and 36 are coupled to input electrodes of amplifier 56 and detector 31, respectively.

In Figure 6, apparatus is schematically illustrated corresponding generally to the form of the invention illustrated by the blocks of Figure 2. Oscillator 25 supplies wobble frequency $f_1$ oscillations to the auxiliary deflection coil 26 as well as to frequency doubler 27. The double wobble frequency output of doubler 27 is applied via the phase adjusting means **29*a*, 29*b* to a grid of the detector 31. The output signal of pickup device 11, after amplification in stage 55 is applied to another grid of detector 31. Low pass filter 33 and $2f_1$ trap 60 are again provided in the plate circuit of detector 31. The plate of detector 31 is coupled to the input electrode of the compensator output amplifier stage 58, which may again, as illustrated, be provided with further means for low pass filtering and $2f_1$ trapping. The gain controls 38' and 36', which, as discussed with respect to Figure 2, control the degree of aperture compensation attained via control of the "sum" and "difference" signals combined in the compensator output, take the form of a potentiometer across the output of amplifying stage 55, and a variable resistance in the cathode circuit of doubler 52', respectively. It may be appreciated that in this arrangement, adjustment of potentiometer 38' will have some effect on the amplitude of the "difference" signal component of the output of detector 31 as well as the "sum" signal component, whereas adjustment of control 36'** would have significant effect only upon the amplitude of the "difference" signal output component.

It may be appropriate at this point to note that an effect of the indicated signal compensation in accordance with the various discussed forms of the invention is to provide an output signal which is a good approximation of that which would be obtained by scanning the pickup device target with a scanning spot having an energy distribution in the vertical direction of a desirable $$\frac{\sin X}{X}$$

form. Curve (*a*) of Figure 7 is illustrative of the energy distribution in the vertical direction of the usual scanning spot. Curve (*b*) of Figure 7 illustrates the effective scanning spot energy distribution in the vertical direction attained through practice of the present invention in accordance with the previously discussed embodiments. A more accurate approximation of a $$\frac{\sin X}{X}$$

energy distribution in the vertical direction, such as indicated by curve (*c*) of Figure 7, may also be attained in accordance with principles of the present invention, through utilization of more complex contemplated embodiments. An effective spot distribution of the type indicated by curve (*c*) may be attained along the lines of the discussed embodiments by not only subtracting information from areas immediately adjacent to the nominally scanned line L, (e.g. subtracting information from lines $L-1$, $L+1$), but in addition adding to a lesser degree information from next adjacent areas (e.g. adding information from lines $L-2$, $L+2$), subtracting information from areas next adjacent to these areas (e.g. subtracting information from lines $L-3$, $L+3$), etc., assuming a wobble deflection amplitude sufficient to regularly intercept all such areas. One manner in which such operation may be effected is to modify the system of Figures 1 or 2, for example, to provide more than one of the synchronous detectors 31, utilize respectively different phases of the oscillator 25 output in the heterodyning action of each detector 31, and appropriately adjust the polarity and amplitude of the respective video output components obtained from each detector 31 so as to effectively achieve the successively appropriate positive or negative responses indicated by curve (*c*).

Another manner in which such an effective scanning spot energy distribution may be effected is to modify the system of Figures 1 or 2, for example, to provide a plurality of the synchronous detectors 31 and respectively utilize the even harmonics of the wobble frequency $f_1$ in the heterodyning actions of respective ones of these detectors. Again, provision may be made for controlling the relative amplitude and polarity of the respective detector outputs so as to effectively achieve the respectively appropriate negative or positive responses. It may also be appreciated that this above-mentioned complex heterodyning may be done with only one synchronous detector by proper combination of the harmonics.

Having thus described the invention, what is claimed is:

1. Apparatus comprising the combination of an image scanning device including means for developing a scanning spot, and means for causing said scanning spot to trace a scanning raster comprising a series of parallel scanning lines, means for generating an image informative signal in response to the tracing of said scanning raster, means for wobbling said scanning spot in a direction substantially perpendicular to said scanning lines throughout each line scanning interval, the generated image informative signal thereby regularly including a component representative of image information corresponding to a given line of said raster and additional components representative of image information corresponding to areas of said raster vertically adjacent to said given line, and means coupled to said signal generating means for deriving an aperture compensated video signal from said generated image informative signal, said deriving means comprising means for deriving from said generated image informative signal a video signal component representative of the sum of said given line image information and said adjacent area image information, and a video signal component corresponding to the difference between said given line image information and said adjacent area image information, said aperture compensated video signal comprising a combination of said sum and difference signal components.

2. Apparatus comprising the combination of an image scanning device including means for developing a scanning spot, and means for causing said scanning spot to trace a scanning raster comprising a series of parallel scanning lines, means for generating an image informative signal in response to the tracing of said scanning raster, means for additionally wobbling said scanning spot in a direction substantially perpendicular to said scanning lines throughout each line scanning interval, the generated image informative signal thereby including a component representative of image information corresponding to a given line of said raster and additional components representative of image information corresponding to areas of said raster vertically adjacent to said given line, and means coupled to said signal generating means for deriving an aperture compensated video signal from said generated image informative signal, said deriving means comprising means coupled to said signal generating means for deriving from said generated image informative signal a video signal component representative of the sum of said given line image information and said adjacent area image information, means coupled to said signal generating means for deriving from said generated image informative signal a video signal component corresponding to the difference between said given line image information and said adjacent area image information, and means coupled to said first named and said second named signal component deriving means for combining said sum and difference signal components.

3. Apparatus in accordance with claim 2 wherein said sum signal deriving means comprises a low pass filter having a cutoff frequency below the frequency of wobble of said scanning spot, and means coupled to said signal generating means for passing said generated image informative signal through said low pass filter.

4. Apparatus in accordance with claim 2 wherein said difference signal deriving means includes means coupled to said signal generating means and to said spot wobbling means for heterodyning said generated image informative signal with oscillations of a frequency harmonically related to the frequency of wobble of said spot.

5. Video signal generating apparatus comprising the combination of an image scanning device including an electron beam source, an electron beam target, beam deflection means for causing said electron beam to trace a scanning raster comprising a series of substantially parallel scanning lines on said target, means for wobbling said electron beam in a direction substantially perpendicular to said scanning lines throughout the scanning of said raster, means for deriving an image informative signal from said image scanning device in response to the tracing of a scanning raster on said target by said wobbled electron beam, means coupled to said deriving means and including a low pass filter for selecting from said image informative signal a video signal component corresponding to a summation of video signals representative of raster areas subject to beam impingement at the peaks of said beam wobble and video signals representative of raster areas subject to beam impingement intermediate said peaks of beam wobble, said low pass filter having a cutoff frequency below the frequency of wobble of said electron beam, means coupled to said deriving means and including a detector for obtaining from said image informative signal a video signal component corresponding to the difference between said wobble peak representative video signals and said other video signals, and means coupled to said signal component selecting means and to said signal component obtaining means for combining said summation representative video signal components and said difference representative video signal components.

6. Apparatus in accordance with claim 5 including means for adjusting the relative amplitudes of the summation representative video signal components and difference representative video signal components added by said adding means.

7. Apparatus in accordance with claim 6 wherein said detector comprises a synchronous detector coupled to said signal deriving means and to said beam wobbling means and responsive to said image informative signal and to oscillations of a frequency harmonically related to the frequency of said beam wobble.

8. Apparatus comprising the combination of an image pickup tube including an electron beam source, a target structure, beam deflection means for providing a deflection field adapted to cause said electron beam to trace on said target a scanning raster comprising a series of substantially parallel scanning lines, auxiliary beam deflection means for providing an auxiliary deflection field adapted to cause said beam of electrons during the scanning of each of said lines to oscillate about the line nominally scanned, said oscillations occurring at a predetermined frequency and resulting in beam traversal of lines of the raster adjacent to the line nominally scanned, means for deriving an output signal from said pickup tube in response to the aforesaid scanning of said target, means coupled to said first named signal deriving means for deriving from said pickup tube output signal the combination of a video signal component corresponding to the sum of information from said adjacent raster lines and information from said line being nominally scanned, and a video signal component corresponding to information from said nominally scanned line minus information from said adjacent raster lines, and means included in said combination deriving means for adjusting the relative amplitudes of the respective video signal components of said derived combination.

9. Apparatus comprising the combination of an image pickup tube including an electron beam source, a target structure, beam deflection means for providing a deflection field adapted to cause said electron beam to trace on said target a scanning raster comprising a series of substantially parallel scanning lines, auxiliary beam deflection means for providing an auxiliary deflection field adapted to cause said beam of electrons during the scanning of each of said lines to oscillate about the line nominally scanned, said oscillations occurring at a predetermined frequency and resulting in beam traversal of lines of the raster adjacent to the line nominally scanned, means for deriving an output signal from said pickup tube in response to the aforesaid scanning of said target, means coupled to said output signal deriving means for selecting from said pickup tube output signal a video signal component comprising the sum of information from said adjacent raster lines and information from said line being nominally scanned, means coupled to said output signal deriving means responsive to said pickup tube output signal for deriving therefrom a video signal component corresponding to information from said nominally scanned line minus information from said adjacent raster lines, means coupled to said signal component selecting means and to said signal component deriving means for combining the respective video signal components, and means for adjusting the relative amplitudes of the respective video signal components combined by said combining means.

10. Apparatus in accordance with claim 9 wherein said auxiliary deflection means includes a source of oscillations of said predetermined frequency, and wherein said video signal component deriving means includes a synchronous detector coupled to said output signal deriving means and responsive to said pickup tube output signal, said apparatus also including a frequency doubler coupled between said oscillation source and said synchronous detector.

References Cited in the file of this patent

UNITED STATES PATENTS

| | | |
|---|---|---|
| 2,222,934 | Blumlein | Nov. 26, 1940 |
| 2,676,200 | Sziklai | Apr. 20, 1954 |
| 2,804,495 | Jesty | Aug. 27, 1957 |

FOREIGN PATENTS

| | | |
|---|---|---|
| 617,357 | Great Britain | Feb. 4, 1949 |